(12) United States Patent
Morgan

(10) Patent No.: US 12,717,923 B1
(45) Date of Patent: *Aug. 25, 2026

(54) MODULAR EMBEDDED CHASSIS WITH FIRMWARE FOR REMOVABLY COUPLED COMPUTE DEVICES, AND METHODS AND SYSTEMS FOR THE SAME

(71) Applicant: Management Services Group, Inc., Virginia, VA (US)

(72) Inventor: Thomas S. Morgan, Virginia Beach, VA (US)

(73) Assignee: Management Services Group, Inc., Virginia Beach, VA (US)

( * ) Notice: Subject to any disclaimer, the term of this patent is extended or adjusted under 35 U.S.C. 154(b) by 51 days.

This patent is subject to a terminal disclaimer.

(21) Appl. No.: 18/763,563

(22) Filed: Jul. 3, 2024

Related U.S. Application Data

(63) Continuation of application No. 18/312,309, filed on May 4, 2023, now Pat. No. 12,056,245, which is a continuation of application No. 17/383,220, filed on Jul. 22, 2021, now Pat. No. 11,675,909, which is a continuation of application No. 16/921,554, filed on Jul. 6, 2020, now Pat. No. 11,100,230.

(Continued)

(51) Int. Cl.

| | |
|---|---|
| ***G06F 21/57*** | (2013.01) |
| ***G06F 1/185*** | (2026.01) |
| ***G06F 1/186*** | (2026.01) |
| ***G06F 9/4401*** | (2018.01) |

(52) U.S. Cl.
CPC .......... *G06F 21/575* (2013.01); *G06F 9/4401* (2013.01); *G06F 21/572* (2013.01); *G06F 1/185* (2013.01); *G06F 1/186* (2013.01)

(58) Field of Classification Search
CPC .... G06F 9/4401; G06F 21/575; G06F 21/572; G06F 1/185; G06F 1/186
USPC .......................................... 713/1, 2; 710/301
See application file for complete search history.

(56) References Cited

U.S. PATENT DOCUMENTS 5,444,707 A 8/1995 Cerna et al.
6,513,113 B1 1/2003 Kobayashi (Continued)

OTHER PUBLICATIONS

Brey et al., "BladeCenter chassis management," IBM Journal of Research and Development 49(6):941-961 (2005).

(Continued)

*Primary Examiner* — Ji H Bae
(74) *Attorney, Agent, or Firm* — COOLEY LLP

(57) ABSTRACT

In some embodiments, an apparatus can include a host board that has multiple connectors. Each connector from the multiple connectors removably connects to a unique compute device from multiple compute devices. The apparatus can further include a memory that stores a first firmware. The apparatus can further include a controller that is operatively coupled to the multiple connectors and the memory. The controller provides access to the first firmware by a compute device from the multiple compute devices when the compute device removably connects to the host board via a connector from the multiple connectors and when a circuit of the compute device disables access to the memory of the compute device to cause the compute device to continue a power-on cycle using the first firmware.

20 Claims, 3 Drawing Sheets

Related U.S. Application Data

(60) Provisional application No. 62/955,779, filed on Dec. 31, 2019.

(56) References Cited

U.S. PATENT DOCUMENTS 6,904,484 B1 6/2005 Nelson
7,254,701 B2 * 8/2007 Lu ......................... G06F 21/575 713/1
7,698,487 B2 4/2010 Rothman et al.
8,607,219 B2 12/2013 Minegishi
8,640,118 B2 1/2014 Grice et al.
9,645,810 B2 5/2017 Kubo
9,747,096 B2 8/2017 Searle et al.
9,805,200 B2 10/2017 Huang et al.
10,083,023 B2 9/2018 Yasutake
10,489,338 B1 11/2019 Chien
11,100,230 B1 8/2021 Morgan
11,675,909 B1 6/2023 Morgan
2002/0019891 A1 2/2002 Morrow et al.
2003/0084337 A1 5/2003 Simionescu et al.
2008/0222313 A1 9/2008 Andrus et al.
2010/0211764 A1 * 8/2010 Fang ..................... G06F 15/177 713/1
2011/0258355 A1 10/2011 Schuette
2012/0180038 A1 7/2012 Hu
2012/0303940 A1 11/2012 Grice et al.
2013/0145139 A1 6/2013 Adam et al.
2014/0075169 A1 3/2014 Andrews et al.
2017/0180137 A1 6/2017 Spanier et al.
2017/0185418 A1 6/2017 Huang et al.
2018/0152341 A1 5/2018 Maeda et al.

OTHER PUBLICATIONS

Hernandez et al., “FirmUSB: Vetting USB Device Firmware using Domain Informed Symbolic Execution,” Proceedings of the 2017 ACM SIGSAC Conference on Computer and Communications Security, pp. 2245-2262 (Oct. 30, 2017).

* cited by examiner

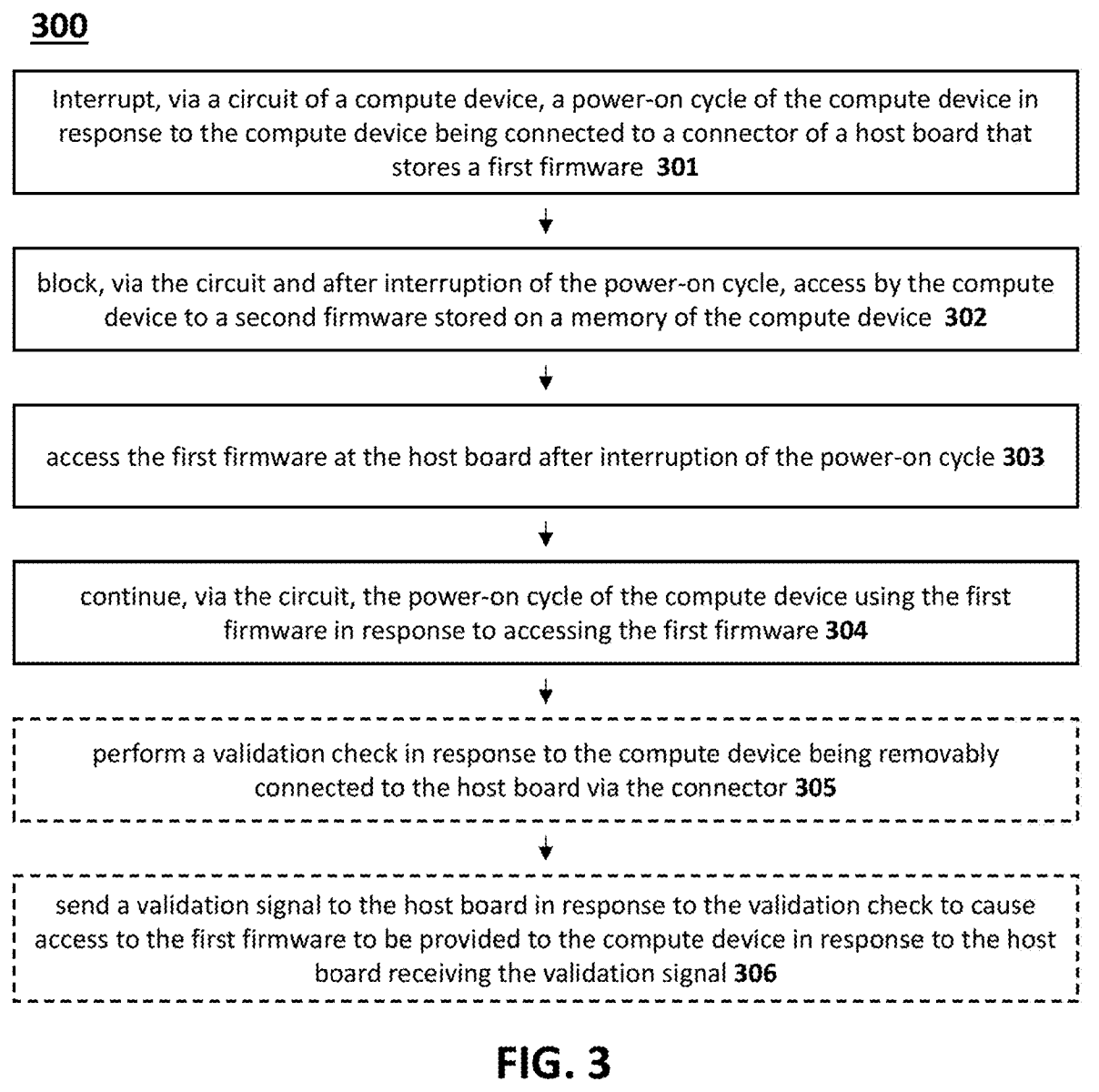

300

Interrupt, via a circuit of a compute device, a power-on cycle of the compute device in response to the compute device being connected to a connector of a host board that stores a first firmware 301 block, via the circuit and after interruption of the power-on cycle, access by the compute device to a second firmware stored on a memory of the compute device 302 access the first firmware at the host board after interruption of the power-on cycle 303 continue, via the circuit, the power-on cycle of the compute device using the first firmware in response to accessing the first firmware 304 perform a validation check in response to the compute device being removably connected to the host board via the connector 305 send a validation signal to the host board in response to the validation check to cause access to the first firmware to be provided to the compute device in response to the host board receiving the validation signal 306

FIG. 3

MODULAR EMBEDDED CHASSIS WITH FIRMWARE FOR REMOVABLY COUPLED COMPUTE DEVICES, AND METHODS AND SYSTEMS FOR THE SAME

CROSS REFERENCE TO RELATED APPLICATION

This application is a continuation of U.S. patent application Ser. No. 18/312,309, filed May 4, 2023, and titled "Modular Embedded Chassis with Firmware for Removably Coupled Compute Devices, and Methods and Systems for the Same," now U.S. Pat. No. 12,056,245, which is a continuation of U.S. patent application Ser. No. 17/383,220, filed Jul. 22, 2021, now U.S. Pat. No. 11,675,909, and titled "Modular Embedded Chassis with Firmware for Removably Coupled Compute Devices, and Methods and Systems for the Same," which is a continuation of U.S. patent application Ser. No. 16/921,554, filed Jul. 6, 2020, and titled "Modular Embedded Chassis with Firmware for Removably Coupled Compute Devices, and Methods and Systems for the Same," now U.S. Pat. No. 11,100,230, which claims priority to and the benefit of U.S. Patent Application No. 62/955,779, filed Dec. 31, 2019 and titled "Modular Embedded Smart Chassis," each of which is incorporated herein by reference in its entirety.

TECHNICAL FIELD

The present disclosure relates to the field of computers/digital processing systems, and in particular to methods and apparatus related to a modular embedded chassis, to which compute devices can securely connect to form a modern computer. The modular embedded chassis stores firmware for operation and management of the compute devices.

BACKGROUND

Known computers or embedded computers each typically use an internal processor to manage performance interruptions that occur due to external and/or internal environmental factors such as, for example, thermal stress, electromagnetic noise, humidity, and/or the like. Increased temperature or thermal stress in the computers or the embedded computers can manifest in degraded performance of the computers or the embedded computers. Thus, a need exists for a chassis that allows for optimization (or improvement) of the computing effectiveness of the computers or the embedded computers based on environmental factors that interrupt optimal performance of and/or disable the computers and the embedded computers.

SUMMARY

In some embodiments, an apparatus can include a host board that has multiple connectors. Each connector from the multiple connectors can removably connect to a unique compute device from multiple compute devices. The apparatus can further include a memory that stores a first firmware. The apparatus can further include a controller that is operatively coupled to the multiple connectors and the memory. The controller provides access to the first firmware by a compute device from the multiple compute devices when the compute device removably connects to the host board via a connector from the multiple connectors and when a circuit of the compute device disables access to the memory of the compute device to cause the compute device to continue a power-on cycle using the first firmware.

BRIEF DESCRIPTION OF THE DRAWINGS

FIG. 3 is a flowchart of a method for operating a modular embedded chassis system, according to an embodiment.

DETAILED DESCRIPTION

Non-limiting examples of various aspects and variations of the embodiments are described herein and illustrated in the accompanying drawings.

One or more embodiments described herein generally relate to methods, apparatus, and systems that use a modular embedded chassis to increase performance, simplicity of device management, and cost effectiveness of operating a set of compute devices. General performance of compute devices, ranging from small embedded compute devices to large servers, can be limited by environmental conditions such as heat. Embedded computers are often limited by spatial dimensions to have better portability and are therefore limited by power consumption because of energy storage constrains. Such spatial dimension variations and power consumption variations in addition to various environmental stimulus (e.g., thermal shock, vibration, noise, and/or the like), which the embedded computers may experience, can be managed using the modular embedded chassis as described herein.

Described herein are modular embedded chassis that are suitable for highly reliable and secure computing systems. The modular embedded chassis described herein provides methods, apparatus, and systems to achieve high performing computing systems for a wide range of environmental factors. The modular embedded chassis described herein includes at least one host board that manages a set of compute devices removably coupled to the at least one host board, and/or supplies intelligence such as for example, control signals and/or a set of firmware to the set of compute devices. As such, the set of compute devices described herein do not complete a power-on cycle and subsequent power-on self-test (POST) process without valid firmware supplied from the at least one host board. Using the modular embedded chassis, numerous compute devices can be booted from a single host board.

A modular embedded chassis can be a useful to host computers or embedded computers for a number of reasons. For example, a modular embedded chassis can maximize performance of the computers or the embedded computers based on environmental factors (e.g., thermal stress). Moreover, a modular embedded chassis can be advantageously used to optimize (or improve) performance of the computers and the embedded computers.

Figure 1:
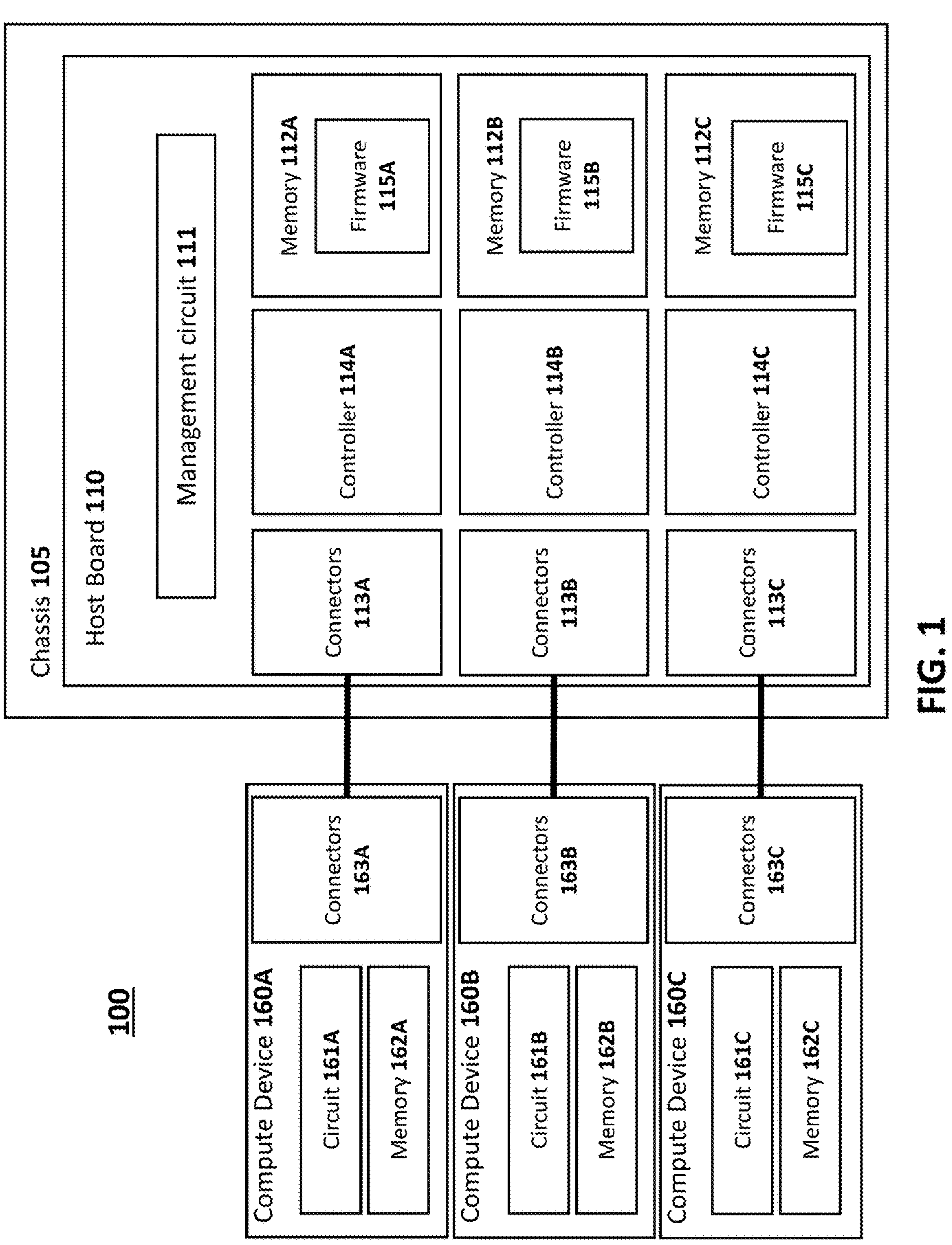
FIG. 1 is a block diagram that illustrates a modular embedded chassis system, according to an embodiment.

FIG. 1 is a block diagram that illustrates a modular embedded chassis system 100, according to an embodiment. The modular embedded chassis system 100 can include a chassis 105 that is operatively coupled to a set of compute devices 160A, 160B, 160C. The chassis 105 of the modular embedded chassis system 100 is a housing that helps interconnect, protect and/or house various electronic components that make up the modular embedded chassis system 100.

The chassis 105 includes a host board 110 and can include additional electronic components such as for example, a cooling fan, a cooling sink, a power supply, and/or the like (not shown). The host board 110 includes a management circuit 111 (also referred to herein as the 'host board management circuit'), a set of memories 112A, 112B, 112C, a set of connectors 113A, 113B, 113C, and a set of controllers 114A, 114B, 114C. The management circuit 111 are connected (without intervening components) or coupled (with or without intervening components) to any of the controllers 114A, 114B, 114C and memories 112A, 112B, 112C. Controllers 114A, 114B, 114C are connected or coupled to connectors 113A, 113B, 113C, respectively. The host board 110 can include a motherboard (not shown) that hosts and enables communication between various electronic components (e.g., the set of connectors 113A, 113B, 113C, the set of controllers 114A, 114B, 114C, and/or the like) of the modular embedded chassis system 100.

The management circuit 111 is an electronic circuit that can manage and synchronize operation of various components of the embedded chassis system 100. The management circuit 111 can include, for example, a hardware-based integrated circuit (IC) or any other suitable electronic signal processing device configured to run or execute a set of instructions or a set of codes. For example, the management circuit 111 can include a general purpose processor, a central processing unit (CPU), a microcontroller, an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), and/or the like. The management circuit 111 can additionally include a memory (not shown), such as, for example, a CPU cache memory or a random access memory (RAM). Including the memory on the management circuit 111 can reduce average time and/or average energy used to process data. In instances where the management circuit 111 is implemented in a general purpose processor, the general purpose processor can be operatively coupled to the memory through a system bus (e.g., address bus, data bus, and/or control bus, not shown).

Each memory from the set of memories 112A, 112B, 112C can include electronic circuitry, a magnetic disk, and/or an optically encoded disk that can be configured to be operatively coupled to the management circuit 111. The set of memories 112A, 112B, 112C each can include, for example, a memory buffer, a random access memory (RAM), a read-only memory (ROM), a hard drive, a flash drive, a secure digital (SD) memory card, a compact disk (CD), an external hard drive, an erasable programmable read-only memory (EPROM), an embedded multi-time programmable (MTP) memory, an embedded multi-media card (eMMC), a universal flash storage (UFS) device, and/or the like. The set of memories 112A, 112B, 112C store and/or include a set of firmware 115A, 115B, 115C, and can further store or include a set of software and/or a set of codes that include instructions to cause a processor (such as the management circuit 111 of the chassis and/or a circuit 161A, 161B, 161C of the set of compute devices 160A, 160B, 160C) to perform procedures such as, for example, control procedures, arithmetic procedures, and/or logical procedures.

The set of firmware 115A, 115B, 115C can be stored and/or implemented as a standardized set of codes and/or a specialized set of codes for low-level control (e.g. operating system) of various electronic components of the modular embedded chassis 100. Alternatively, the set of firmware 115A, 115B, 115C can be implemented and/or encoded in a hardware (e.g., an FPGA). In some implementations, the set of firmware can denote a set of codes or instructions that are specifically used for operation of electronic hardware of the set of compute devices 160A, 160B, 160C, and/or the modular embedded chassis 105. In some implementations, the set of firmware can denote a set of processor machine instructions for Basic Input/Output System (BIOS) of the set of compute devices 160A, 160B, 160C, and/or the modular embedded chassis 105. In some implementations, the set of firmware can denote a set of control systems for operation of peripheral devices, remote device, and/or internet-of-thing (IoT) devices (not shown) that have, for example, relatively simple electronic circuitry compared to an electronic circuitry of a desktop computer.

In some implementations, the set of firmware 115A, 115B, 115C can be changed and/or updated by a user of the set of compute devices 160A, 160B, 160C, a user of the chassis 105, manufacturer of the modular embedded chassis 105, and/or manufacturers of various components of the modular embedded chassis 105. In such implementations, the set of firmware 115A, 115B, 115C can be changed and/or updated to fix known issues or bugs, and/or to add new features to the modular embedded chassis 105 and/or the set of compute devices 160A, 160B, 160C. In some implementations, the set of firmware 115A, 115B, 115C can be stored in a set of permanent memories (e.g., a set of read-only memories) and are typically not changed or updated during the lifetime of the set of memories 112A, 112B, 112C. Each firmware from the set of firmware 115A, 115B, 115C can be configured to be uniquely associated with a compute device type from a set of compute device types of the set of compute devices 160A, 160B, 160C.

The set of connectors 113A, 113B, 113C enable the set of compute devices 160A, 160B, 160C to communicate with (e.g., send data to and/or receive data from) the chassis 105. In some implementations, the set of connectors 113A, 113B, 113C can include and/or enable, for example, a network interface controller (NIC), wireless connection, a wired port, and/or the like. In some implementations, the set of connectors 113A, 113B, 113C can establish and/or maintain a communication session between the chassis and another device (e.g., via a computer network or the internet, not shown). Similarly stated, the set of connectors 113A, 113B, 113C can enable the chassis 105 to send data to and/or receive data from another device.

In some implementations, the set of connectors the set of connectors 113A, 113B, 113C of the chassis 105 can include a custom-designed connectors with high data transfer speed and high data integrity. In some other implementations, the set of connectors 113A, 113B, 113C of the chassis 105 can include a standard connector such as, for example, a category 6 (Cat 6) Ethernet cable, a universal serial bus (USB) connector(s), a USB 2.0 connector(s), a USB 3.0 connector(s), a mini USB connector(s), a micro USB connector(s), a USB-c connector(s), a high definition multimedia interface (HDMI) connector(s), a video graphics array connector(s), a general purpose input/output (GPIO) connector(s), a general purpose interface bus (GPIB or IEEE-488) connector(s), and/or the like. In one example, a connector (e.g., a copper wire having two ends and with one male USB connector at each end) from the set of connectors 113A, 113B, 113C can have a corresponding USB 3.0 receptacle (female connector) located at the host board 110 of the chassis 105 and a USB 3.0 receptacle at a compute device from the set of compute devices 160A, 160B, 160C to connect the connector to the compute device.

The set of controllers 114A, 114B, 114C can include a set of electronic circuitry to control access between various parts of the modular embedded chassis 100. Each controller from the set of controllers 114A, 114B, 114C can be operatively coupled to the set of connectors 113A, 113B, 113C of the chassis 105 and/or the set of memories 112A, 112B, 112C. Each controller from the set of controller 114A, 114B, 114C can be configured to grant a compute device from the set of compute devices 160A, 160B, 160C access to the set of firmware 115A, 115B, 115C that are included or stored in the set of memories 112A, 112B, 112C.

The set of compute devices 160A, 160B, 160C can include compute devices with any spatial dimension and/or computing power. For example, the set of compute devices 160A, 160B, 160C can be small embedded compute devices for internet-of-things (IoT) applications, smart phones, laptops, personal desktop computers, mainframe computers, data servers, and/or the like. Each compute device from the set of compute devices 160A, 160B, 160C can include a circuit from a set of circuits 161A, 161B, 161C, a memory from a set of memories 162A, 162B, 162C, and a connector from a set of connectors 163A, 163B, 163C, respectively.

The set of memories 162A, 162B, 162C can include electronic circuitry, a magnetic disk, and/or an optically encoded disk that can be configured to be operatively coupled to the set of circuits 161A, 161B, 161C. The set of memories 162A, 162B, 162C can include, for example, a memory buffer, a random access memory (RAM), a read-only memory (ROM), a hard drive, a flash drive, a secure digital (SD) memory card, a compact disk (CD), an external hard drive, an erasable programmable read-only memory (EPROM), an embedded multi-time programmable (MTP) memory, an embedded multi-media card (eMMC), a universal flash storage (UFS) device, and/or the like. Moreover, in some implementations, the set of memories 162A, 162B, 162C can store a set of firmware (not shown) for low-level control (e.g. operating system) of various electronic components of the set of compute devices 160A, 160B, 160C.

The set of circuits 161A, 161B, 161C can include a set of electronic circuitry such as, for example, a hardware-based integrated circuit (IC) or any other suitable electronic signal processing device configured to run or execute a set of instructions and/or a set of codes. For example, the set of circuits 161A, 161B, 161C can include a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), and/or the like. The set of circuits 161A, 161B, 161C can additionally include a memory other than the set of memories 162A, 162B, 162C, such as, for example, a CPU cache memory or a random-access memory (RAM). A circuit from the set of circuits 161A, 161B, 161C can be configured to disable (or block) access to a memory from the set of memories 162A, 162B, 162C. The act of disabling (or blocking) access to the memory (and firmware) of a compute device can be performed by the circuit of the compute device and not by the host board. In other words, the circuit of the compute device can disable (or block) access to the memory (and firmware) without involvement of processing of the host board such as at the management circuit or the controller(s).

In some implementations, the set of connectors 163A, 163B, 163C of the set of compute devices 160A, 160B, 160C can include a custom-designed connectors with high data transfer speed and high data integrity. In some other implementations, the set of connectors 163A, 163B, 163C of the set of compute devices 160A, 160B, 160C can include a standard connector such as, for example, a category 6 (Cat 6) Ethernet cable, a universal serial bus (USB) connector(s), a USB 2.0 connector(s), a USB 3.0 connector(s), a mini USB connector(s), a micro USB connector(s), a USB-c connector (s), a high definition multimedia interface (HDMI) connector(s), a video graphics array connector(s), a general purpose input/output (GPIO) connector(s), a general purpose interface bus (GPIB or IEEE-488) connector(s), and/or the like. In one example, a connector such as, for example, an optical fiber having two ends and with one male Registered Jack 45 (RJ45) Ethernet connector at each end, can have a corresponding Ethernet receptacle (female connector) located at the host board 110 of the chassis 105 and an Ethernet receptacle at a compute device from the set of compute devices 160A, 160B, 160C to connect the connector to the compute device.

The set of connectors 163A, 163B, 163C can be configured to removably connect to a set of connectors 113A, 113B, 113C of the chassis 105 to establish a connection that provides high data transfer speed and high data integrity. In some implementations, the connection can provide electrical power in addition to high data transfer speed and high data integrity. In some instances, the electrical power can be transferred from the chassis 105 to the set of compute devices 160A, 160B, 160C to provide energy for operation of the set of compute devices 160A, 160B, 160C.

In some implementations, the set of connectors 163A, 163B, 163C of the set of compute devices 160A, 160B, 160C and the set of connectors 113A, 113B, 113C of the host board 110 each can include a set of pins and/or a set of sockets. A power and/or electrical potential on a predetermined pin from the set of pins and/or a predetermined socket from the set of sockets can provide an indicator to a compute device from the set of compute devices 160A, 160B, 160C and/or the host board 110 that the compute device is connected to the modular embedded chassis 100. This indicator can be used by each compute device 160A, 160B, 160C to determine that it has been connected to a host board 110 that will provide firmware and that the respective circuit 161A, 161B, 161C should disable access to the firmware stored in the respective memory 162A, 162B, 162C. This indicator can also be used by the host board 110 to determine that it has been connected to a compute device 160A, 160B, 160C to which it will provide access to the firmware stored on the host board 110.

In some implementations, each connector from the set of connectors 113A, 133B, 113C of the host board 110 can removably connect to a unique compute device from the set of compute devices 160A, 160B, 160C to establish a high data transfer speed and high data integrity communication between each connector and the unique compute device. In one example, the connector 113A can removably connect to the connector 163A of the compute device 160A to establish a high data transfer speed and high data integrity communication between the host board 110 and the compute device 160A. The controller 114A from the set of controllers 114A, 114B, 114C of the host board 110 can provide access to the firmware 115A from the set of firmware 115A, 115B, 115C of the set of memories 112A, 112B, 112C by the compute device 160A, in response to the compute device 160A removably connecting to the host board 110 via the connector 163A and connector 113A. Moreover, the circuit 161A of the compute device 160A can be configured to disable (or block) access to the memory 162A of the compute device 160A. The controller 114A of the host board 110 can provide access to the firmware 115A by the compute device 160A in response to the compute device 160A removably connecting to the host board 110 via the connector 163A and connector 113A and in response to the disabled (or blocked) access of the memory 162A, to continue a power-on cycle using the firmware 115A.

In some implementations, a first controller (e.g., the controller 114A) from the set of controllers 114A, 114B, 114C and a first memory (e.g., the memory 112A) from the set of memories 112A, 112B, 112C are operatively coupled to a first connector (e.g., 113A) from the set of connectors 113A, 113B, 113C. In such embodiments, the first controller and the first memory are not operatively coupled to the remaining connectors (e.g., 113B and 113C). The host board 110 further includes a second controller (e.g. the controller 114B), a second memory (e.g., the memory 112B) and a second connector (e.g., the connector 113B). The second controller and the second memory are operatively coupled to the second connector. The second controller and the second memory are not operatively coupled to the remaining connectors (e.g., 113A and 113C).

In some implementations, each compute device from the set of compute device 160A, 160B, 160C has a circuit from the set of circuits 161A, 161B, 161C and a memory from the set of memories 162A, 162B, 162C, respectively. The memory for a given compute device 160A, 160B, 160C is operatively coupled to the circuit of that compute device. A first compute device from the set of compute devices 160A, 160B, 160C can be removably connected to the host board 110 via a first connector from the set of connectors 113A, 113B, 113C. The circuit of the first compute device can disable (or block) access to the memory of that first compute device in response to the first compute device removably connecting to the host board 110.

The circuit of the first compute device can perform a validation check in response to the first compute device removably connecting to the host board. The validation check can include, for example, transmitting a validation signal from the first compute device to the host board 110. In some implementations, the validation check can include receiving a validation response signal from the host board 110. A first controller of the set of controllers 114A, 114B, 114C of the host board 110 can provide access to a first firmware from the set of firmware 115A, 115B, 115C stored in the set of memories 112A, 112B, 112C of the host board 110 in response to the validation check and/or the validation signal indicating that the compute device 160A, 160B, 160C is valid for connection to that host board 110. The validation check can, for example, validate that the compute device and the host board are permitted to be removably coupled together. Such a validation can be based on, for example, a predefined registration of the type and/or serial number of compute device and/or host board. Such a serial number of the compute device and/or host board can indicate an owner, organizational identifier, access permission, etc. that indicates allowable use of the compute device and host board together.

In some instances, a second compute device from the set of compute devices 160A, 160B, 160C can be removably connected to the host board 110. A circuit of the second compute device can be configured to disable (or block) access to a memory of the second compute device in response to the second compute device removably connecting to the host board 110 via a second connector from the set of connectors 113A, 113B, 113C. The circuit of the second compute device can perform a validation check in response to the second compute device removably connecting to the host board. The validation check can include, for example, transmitting a validation signal from the second compute device to the host board 110. The first controller can provide access to the first firmware in response to the validation check and/or the validation signal to continue a power-on cycle using the first firmware and disable (or block) access to a second firmware stored in the memory of the second compute device. In some embodiments, the first controller can provide access to a third firmware (a fourth firmware, a fifth firmware, and/or the like) from the set of firmware 115A, 115B, 115C stored in the set of memories 112A, 112B, 112C of the host board 110, in response to the validation check and/or the validation signal to continue a power-on cycle using the third firmware and disable (or block) access to the second firmware stored in the memory of the second compute device.

In some implementations, the set of memories 112A, 112B, 112C of the host board 110 store multiple firmware, such as the set of firmware 115A, 115B, 115C, that include the first firmware and the third firmware. Each firmware from the plurality of firmware can be uniquely associated with a type of compute device from the set of compute devices 160A, 160B, 160C. In some instances, the set of compute devices can include a type of compute device that is particularly suitable for data storage, a type of compute device that is particularly suitable for data processing, a type of compute device that is particularly suitable for graphic processing, and/or the like. The first controller can be configured to identify the type of the second compute device in response to the second compute device being removably connected to the host board 110 via the second connector. The first controller can select an appropriate type of firmware such as, for example, the third firmware, based on the type of compute device of the second compute device. The first controller can provide access to the third firmware, in response to the validation check and/or validation signal, to continue a power-on cycle using the third firmware and disable (or block) access to the second firmware in a memory of the second compute device.

In implementation shown in FIG. 1, the host board 105 includes a set of memories 112A, 112B, 112C, a set of controllers 114A, 114B, 114C, and a set of connectors 113A, 113B, 113C. A connector from the set of connectors 113A, 113B, 113C is coupled (with or without intervening components) to at least one of the controllers 114A, 114B, 114C and at least one of the memories 112A, 112B, 112C, and can provide access to at least one firmware from the set of firmware 115A, 115B, 115C by a compute device from the set of compute devices 160A, 160B, 160C that removably connects to the connector.

In an alternative embodiment, the host board can include a memory (not shown) (which can be structurally and/or functionally similar to any of the set memories 112A, 112B, 112C of FIG. 1). Also, the host board can include a controller (not shown) (which can be structurally and/or functionally similar to any of the controllers 114A, 114B, 114C). A connector from the set of connectors (similar to connectors 113A, 113B, 113C of FIG. 1) can be coupled (with or without intervening components) to the controller and to the memory. In such alternative embodiment, the memory can store and/or include the set of firmware (similar to firmware 115A, 115B, 115C of FIG. 1), and can further store or include the set of software and/or the set of codes that include instructions to cause the processor to perform procedures such as, for example, control procedures, arithmetic procedures, and/or logical procedures. The controller and the memory can provide access to at least one firmware from the set of firmware by a compute device from the set of compute devices that removably connects to a connector from the set of connectors.

In some implementations, the management circuit 111 of the host board 110 can be operatively coupled to a controller from the set of controllers 114A, 114B, 114C. The management circuit 111 can further provide a user interface to a user of the modular embedded chassis 100 via a graphical user interface (GUI) at a peripheral device (such as a display) connected to chassis 105 and/or the host board 110. The management circuit 111 can be configured to coordinate operation collectively of the set of computed devices 160A, 160B, 160C, when the set of computed devices 160A, 160B, 160C are removably connected to the set of connectors 113A, 113B, 113C of the host board 110. In some implementations, the management circuit 111 coordinates operation of the set of compute devices 160A, 160B, 160C in response to a user input received via the user interface, in addition to the set of computed devices 160A, 160B, 160C being removably connected to the set of connectors 113A, 113B, 113C. In some implementations, each compute device from the set of compute devices 160A, 160B, 160C have a function different from a set of functions of the remaining set of compute devices 160A, 160B, 160C. The management circuit 111 can be configured to coordinate collective operation of the set of compute devices 160A, 160B, 160C to perform the function and/or the set of functions. Such coordinated operations of the set of compute devices 160A, 160B, 160C can form an overall compute device having greater capabilities than the capabilities of any given compute device from the set of compute devices 160A, 160B, 160C.

As shown in FIG. 1, a compute device (e.g., 160A) from the set of compute devices 160A, 160B, 160C can include a connector (e.g., 163A) from the set of connectors 163A, 163B, 163C, a memory (e.g., 162A) from the set of memories 162A, 162B, 162C, and a circuit (e.g., 161A) from the set of circuits 161A, 161B, 161C. The connector (e.g., 163A) can removably connect to a connector from the set of connectors 113A, 113B, 113C of the host board 110, which stores the set of firmware 115A, 115B, 115C in the set of memories 112A, 112B, 112C. The circuit (e.g., 161A) can be operatively coupled to the memory and the circuit, and can interrupt a power-on cycle of the compute device in response to the compute device removably connecting to the host board 110 via the connector of the compute device and the connector of the host board 110. The circuit can then block access to a second firmware stored or included in the compute device, and instead access a first firmware from the set of firmware 115A, 115B, 115C of the host board 110 to complete the power-on cycle using the first firmware in response to accessing the firmware. In some implementations, the circuit can disable (or block) access to the memory in response to the compute device removably connecting to the connector of the host board.

Figure 2:
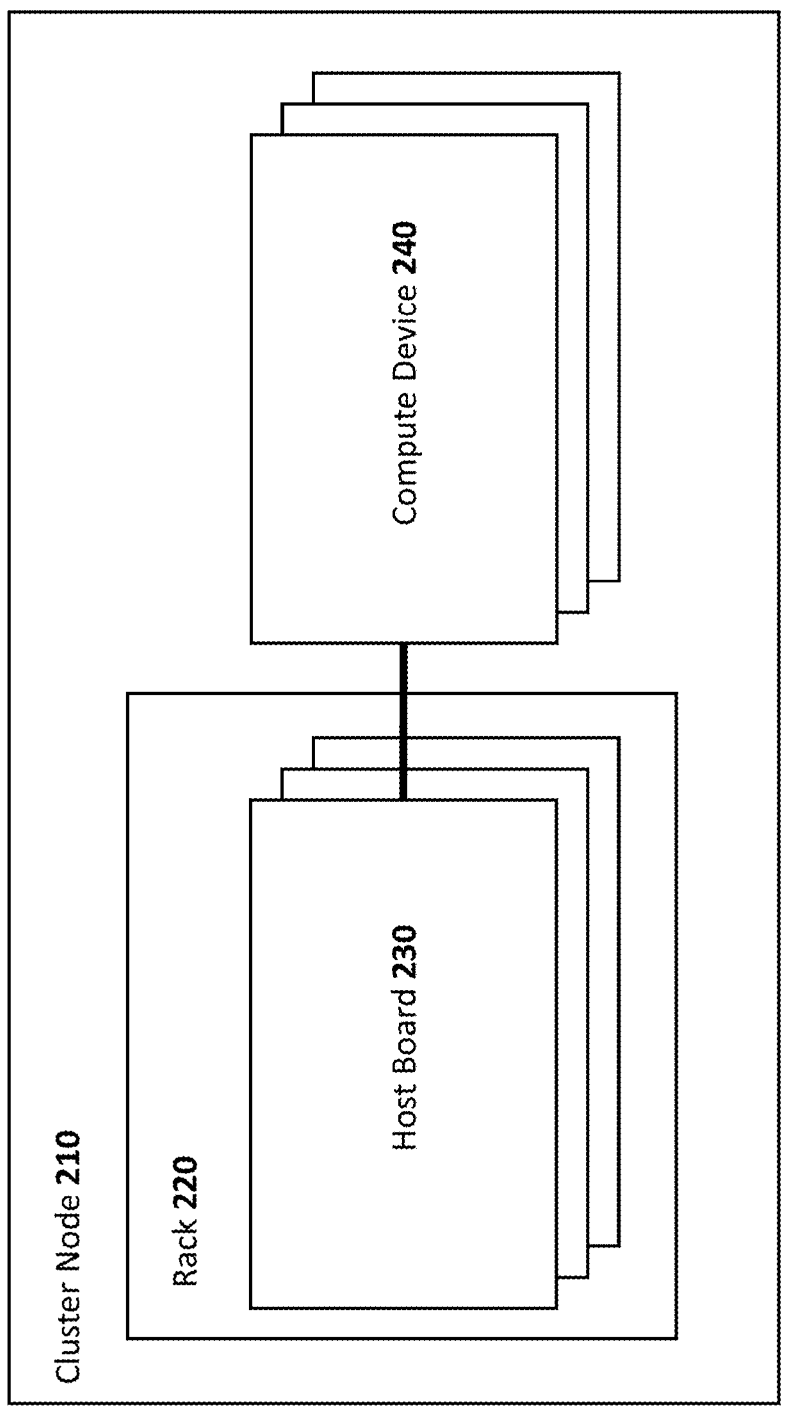
FIG. 2 is a block diagram that illustrates a cluster node implemented using a modular embedded chassis system, according to an embodiment.

FIG. 2 is a block diagram that illustrates a cluster node 210 implemented using modular embedded chassis system, according to an embodiment. The cluster node 210 includes a rack 220 (e.g., a blade server) and a set of compute devices 240 (similar to the set of compute devices 160A, 160B, 160C shown and described with respect to FIG. 1). The rack 220 can include a set of host boards 230 that can be operatively coupled to the set of compute devices 240. The host boards 230 can be similar to the host board 110 shown and describe with respect to FIG. 1. Each host board from the set of host boards 230 can be operatively coupled to at least one remaining host board from the set of host boards 230. In one example, the set of host boards 230 can be configured to operatively couple to a central motherboard (not shown). In another example, each host board from the set of host boards 230 can be configured to operatively couple, in series, to one another host board from the set of host boards 230. In another example, each host board from the set of host boards 230 can be configured to operatively couple, in parallel, to multiple host boards from the set of host boards. Thus, the set of host boards 230 and the set of compute devices 240 can collectively define the cluster node 210 and operate as a common entity when the set of compute devices 240 are operatively coupled to the set of host boards 230. In some embodiments, the rack 220 can be similar to the chassis 105, as shown and described with respect to FIG. 1, that can include multiple host boards.

In some implementations, at least one management circuit (such as the management circuit 111 shown and described with respect to FIG. 1) from the set of host boards 230 can be configured to coordinate operation of the common entity, including the set of host boards 230 and the set of compute devices 240. In some implementations, the cluster node 210 can include a control unit (not shown) to coordinate operation of the common entity. Coordinating the operation of the common entity can be used for computing (e.g., high performance computing (HPC)) and/or data communication applications (data server application) and can involve computing task management and data communication management between the set of host boards 230 and the set of compute devices 240.

FIG. 3 is a flowchart of a method 300 for operating a modular embedded chassis system (such as the modular embedded chassis system 100 shown and described with respect to FIG. 1), according to an embodiment. At 301, a circuit (such as any of the set of circuits 161A, 161B, 161C shown and described with respect to FIG. 1) of a compute device (such as any of the set of compute devices 160A, 160B, 160C shown and described with respect to FIG. 1) can be configured to interrupt, a power-on cycle of the compute device in response to the compute device being connected to a connector (such as any of the set of connectors 113A, 113B, 113C shown and described with respect to FIG. 1) of a host board (such as the host board 110 shown and described with respect to FIG. 1) that stores a first firmware (such as any of the set of firmware 115A, 115B, 115C shown and described with respect to FIG. 1). At 302, the circuit can be configured to block, after interruption of the power-on cycle, access by the compute device to a second firmware stored on a memory (such as any of the memories 162A, 162B, 162C shown and described with respect to FIG. 1) of the compute device.

At 303, the circuit can be configured to access the first firmware at the host board after interruption of the power-on cycle. At 304, the circuit can be configured to continue the power-on cycle of the compute device using the first firmware in response to accessing the first firmware. At 305, the circuit can be optionally configured to perform a validation check in response to the compute device being removably connected to the host board via the connector. The validation check can, for example, validate that the compute device and the host board are permitted to be removably coupled together. Such a validation can be based on, for example, a predefined registration of the type and/or serial number of compute device and/or host board. Such a serial number of the compute device and/or host board can indicate an owner, organizational identifier, access permission, etc. that indicates allowable use of the compute device and host board together. At 306, the circuit can be optionally configured to send a validation signal to the host board in response to the validation check to cause access to the first firmware to be provided to the compute device in response to the host board receiving the validation signal.

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized, and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A non-transitory processor-readable medium comprising instructions that, when executed by a processor of a first compute device, cause the processor to:

block, via the processor and in response to the first compute device being connected to a first connector of a host board storing a first firmware, access by the first compute device to a second firmware stored on a memory of the first compute device;

perform a validation check in response to the first compute device being connected to the first connector of the host board;

send a validation signal to the host board in response to the validation check to cause access to the first firmware to be provided to the first compute device in response to the host board receiving the validation signal, receive the first firmware from the host board in response to the host board receiving the validation signal; and continue, via the processor, a power-on cycle of the first compute device using the first firmware in response to accessing the first firmware.

2. The non-transitory processor-readable medium of claim 1, wherein the instructions further include instructions that when executed by the processor cause the processor to:

operate the first compute device collectively with a second compute device that is removably coupled to the host board, based on a coordination provided by a management circuit of the host board when the first compute device and the second compute device are removably connected to the host board.

3. The non-transitory processor-readable medium of claim 1, wherein the instructions to perform the validation check include instructions to perform the validation check based on at least one of (1) a type or a serial number of the first compute device or (2) a type or a serial number of the host board.

4. The non-transitory processor-readable medium of claim 1, wherein the instructions to perform the validation check include instructions to perform the validation check based on at least one of (1) a serial number of the first compute device and indicative of at least one of an owner, an organization or an access permission, or (2) a serial number of the host board and indicative of at least one of an owner, an organization or an access permission.

5. The non-transitory processor-readable medium of claim 1, wherein:

the host board stores a plurality of firmware including the first firmware and a third firmware different from the first firmware, each firmware from the plurality of firmware being uniquely associated with a type of compute device from a plurality of types of compute devices and not associated with the remaining types of compute devices from the plurality of types of compute devices, the first firmware being uniquely associated with a type of the first compute device.

6. The non-transitory processor-readable medium of claim 1, wherein the first compute device is associated with a function different from a function associated with a second compute device that is operated collectively with the first compute device.

7. The non-transitory processor-readable medium of claim 1, wherein the first compute device, a second compute device coupled to the host board and the host board collectively operate as an overall compute device.

8. The non-transitory processor-readable medium of claim 1, wherein the first compute device, a second compute device coupled to the host board and the host board collectively operate as an overall compute device having a set of capabilities greater than a set of capabilities of the first compute device alone and greater than a set of capabilities of the second compute device alone.

9. The non-transitory processor-readable medium of claim 1, wherein:

the first compute device is associated with a first function and not a second function, a second compute device is coupled to the host board, the second compute device is associated with the second function and not the first function, the first compute device, the second compute device and the host board collectively operate as an overall compute device having a set of capabilities greater than a set of capabilities of the first compute device alone and greater than a set of capabilities of the second compute device alone.

10. The non-transitory processor-readable medium of claim 1, wherein the host board is a first host board included within a plurality of host boards disposed within a common rack, each host board from the plurality of host boards is operatively coupled to at least one remaining host board from the plurality of host boards, the instructions further include instructions that when executed by the processor cause the processor to:

operate the plurality of host boards, the first compute device and a second compute device as a common entity when the first compute device and the second compute device are removably connected to the host board.

11. A non-transitory processor-readable medium, comprising instructions that, when executed by a processor at a host board, cause the processor to:

receive, at the processor, a validation signal indicating a first compute device performed a validation check in response to the first compute device being removably connected to the host board, the host board having a memory storing a first firmware and a second firmware different from the first firmware;

provide access to, at the host board to the first compute device and in response to receiving the validation signal from the first compute device, the first firmware to cause the first compute device to continue a power-on-cycle using the first firmware and not a firmware stored on the first compute device;

receive, at the processor, a validation signal indicating a second compute device performed a validation check in response to the second compute device being removably connected to the host board; and provide access to, at the host board to the second compute device and in response to receiving the validation signal in response to the second compute device, the second firmware to cause the second compute device to continue a power on-cycle using the second firmware and not a firmware stored on the second compute device.

12. The non-transitory processor-readable medium of claim 11, wherein:

the instructions to receive the validation signal for the first compute device are executed in response to the first compute device being removably connected to the host board, the instructions to receive the validation signal for the second compute device are executed in response to the second compute device being removably connected to the host board.

13. The non-transitory processor-readable medium of claim 11, wherein the first firmware is uniquely associated with a first type of compute device, the second firmware is uniquely associated with a second type of compute device different than the first type of compute device, the non-transitory processor-readable medium further comprising instructions that when executed by a processor cause the processor to:

identify the first compute device as the first type of compute device in response to the first compute device being removably connected to the host board, the providing access to the first firmware being based on identifying the first compute device as the first type of compute device; and identify the second compute device as the second type of compute device in response to the second compute device being removably connected to the host board, the providing access to the second firmware being based on identifying the second compute device as the second type of compute device.

14. The non-transitory processor-readable medium of claim 11, wherein:

the validation signal for the first compute device indicates that the first compute device performed the validation check based on at least one of (1) a type or a serial number of the first compute device or (2) a type or a serial number of the host board; and the validation signal for the second compute device indicates that the second compute device performed the validation check based on at least one of (1) a type or a serial number of the second compute device or (2) a type or a serial number of the host board.

15. The non-transitory processor-readable medium of claim 11, wherein:

the validation signal for the first compute device indicates that the first compute device performed the validation check based on at least one of (1) a serial number of the first compute device and indicative of at least one of an owner, an organization or an access permission, or (2) a serial number of the host board and indicative of at least one of an owner, an organization or an access permission; and the validation signal for the second compute device indicates that the second compute device performed the validation check based on at least one of (1) a serial number of the second compute device and indicative of at least one of an owner, an organization or an access permission, or (2) a serial number of the host board and indicative of at least one of an owner, an organization or an access permission.

16. The non-transitory processor-readable medium of claim 11, further comprising instructions that when executed by a processor cause the processor to:

receive, through a user interface, user input associated with at least one of the host board, the first compute device or the second compute device; and coordinate operation collectively of the host board, the first compute device and the second compute device based on the user input and when the first compute device and the second compute device are removably connected to the host board.

17. The non-transitory processor-readable medium of claim 11, wherein the first compute device is associated with a function different from a function associated with the second compute device, the non-transitory processor-readable medium further comprising instructions that when executed by a processor cause the processor to:

receive, through a user interface, user input associated with at least one of the host board, the first compute device or the second compute device; and coordinate operation collectively of the host board, the first compute device and the second compute device based on the user input and when the first compute device and the second compute device are removably connected to the host board.

18. The non-transitory processor-readable medium of claim 11, wherein:

the host board is a first host board included within a plurality of host boards disposed within a common rack, each host board from the plurality of host boards is operatively coupled to at least one remaining host board from the plurality of host boards, the non-transitory processor-readable medium further comprising instructions that when executed by a processor cause the processor to:

operate the plurality of host boards, the first compute device and the second compute device as a common entity when the first compute device and the second compute device are removably connected to the host board.

19. The non-transitory processor-readable medium of claim 11, wherein the first compute device and the second compute device and the host board collectively operate as an overall compute device having a set of capabilities greater than a set of capabilities of the first compute device alone and greater than a set of capabilities of the second compute device alone.

20. The non-transitory processor-readable medium of claim 11, wherein:

the first compute device is associated with a first function and not a second function, the second compute device is associated with the second function and not the first function, the first compute device and the second compute device and the host board collectively operate as an overall compute device having a set of capabilities greater than a set of capabilities of the first compute device alone and greater than a set of capabilities of the second compute device alone.

* * * * *